Jan. 29, 1924.

J. C. BARTLEY 1,481,974

ADJUSTABLE GLARE SHIELD FOR AUTOMOBILES

Filed Sept. 5, 1922

Inventor
John C. Bartley.
By A. J. O'Brien
Attorney

Patented Jan. 29, 1924.

1,481,974

UNITED STATES PATENT OFFICE.

JOHN C. BARTLEY, OF DENVER, COLORADO, ASSIGNOR OF ONE-HALF TO HARLEY I. JONES, OF DENVER, COLORADO.

ADJUSTABLE GLARE SHIELD FOR AUTOMOBILES.

Application filed September 5, 1922. Serial No. 586,191.

*To all whom it may concern:*

Be it known that I, JOHN C. BARTLEY, a citizen of the United States, residing at the city and county of Denver and State of Colorado, have invented certain new and useful Improvements in Adjustable Glare Shields for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to glare shields for automobiles and has reference specifically to an adjustable shield mounted near the top of the windshield.

It is well known to people accustomed to driving automobiles that there are several things that seriously interfere with the vision and cause great annoyance as well as sometimes being the cause of accidents. Among the things referred to above I may mention as the most widely recognized, first the glare from the headlights of an approaching automobile. Second, the glare caused by the sun's rays. Third, the glare from snow and sand, and last but not least, the effect of rain or snow striking the windshield.

In order to protect the driver of a car from the above mentioned interferences with his vision, many different devices have been invented, some of which are effective to a certain extent. It has been proposed to carry an adjustable colored glass plate fastened to the steering post or to the windshield frame, and it has also been proposed to attach a sort of a vizor to the upper front edge of the windshield. Glare shields of the former type are effective against the glare due to a strong artificial light or to sunlight reflected from sand and snow, while the vizor is effective against rain or snow, but is of very little value against strong direct or reflected light.

It is the object of this invention to provide a glare shield that is adjustably connected to the front of the windshield near the top thereof and to provide means whereby the same may be conveniently adjusted to suit the conditions existing at the time of its use. The shield is formed principally of a piece of transparent colored member, made of a material such as perrine, held in a suitable frame that is hingedly connected to the windshield frame.

In order to more clearly describe my invention and its operation, I shall have reference to the accompanying drawing in which Fig. 1 is a side elevation of a portion of a car and shows my improved glare shield attached thereto, a portion of the body of the car being broken away to show the operating mechanism.

Figure 1:
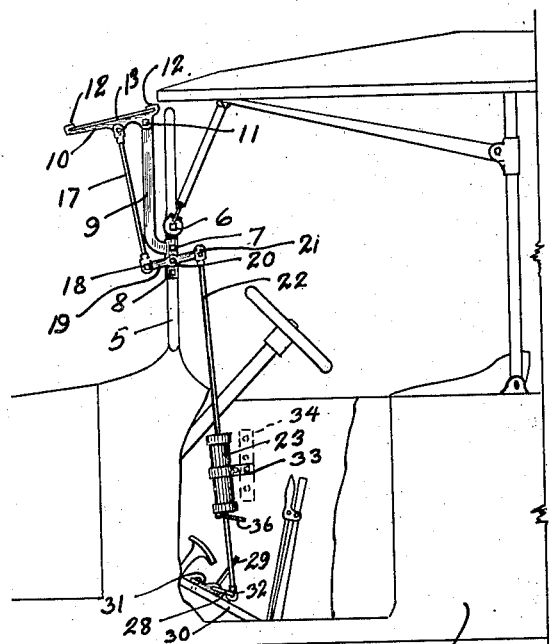
Figure 2:
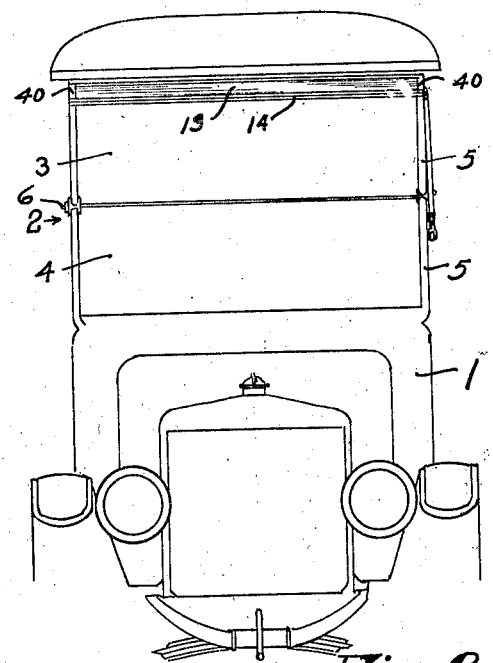
Fig. 2 is a front elevation of the car shown in Fig. 1.

The same reference characters will be used to indicate the same parts throughout the several views. Numeral 1 represents an automobile as a whole, and 2 the windshield, which is usually formed of two sections 3 and 4, properly connected to a frame 5. In the make of automobile to which my improvement is shown attached, the windshield frame 5 is made in two sections, connected by a hinge 6. Fastened to the lower section of the windshield frame 5 by means of tap bolts 7 and 8 is a bracket 9 which has its lower end offset with respect to the body thereof, all as clearly shown in Figs. 1 and 3. To the upper ends of brackets 9, I pivot a bracket 10 by means of a bolt or rivet 11. Brackets 10 are provided with reversely bent fingers 12, which serve to engage the edges of a shielding member 13 which is preferably formed by a piece of perrine, or other similar material, whose edges are bound by U-shaped metal strips 14 and clamped in place in the brackets by means of screws 15. In order to adjust the shield about its pivots 11, I pivotally attach thereto at point 16 a rod 17, whose lower end is pivoted at 18 to the front end of a lever 19, which is pivoted at 20 to the windshield frame 5. Pivoted at 21 to the rear end of lever 19 is a second bar 22, which extends into the tubular casing 23 through cap 24 and has its lower end threadedly connected to the block 25 (Fig. 4). A compression spring 26 of helical shape surrounds rod 22 and abuts its ends against cap 24 and block 25, and tends to keep the latter in the position shown in Fig. 4. A rod 27 extends from the block 25 to the end 28 of the pedal 29 which is pivotally connected at 32 to board 30 by means of a strap 31. The tubular casing 23 is pivotally connected at 33 to member 34 by means of clamp 35. Member 34 is secured to the left hand side of the car, which has been broken away in Figs. 1 and 3, by bolts or other suitable means (not shown). The several members are so adjusted that when the block 25 is in its lowermost position, the shield will occupy a position somewhat like that shown in Figs. 1 and 3. If it is desired to move the shield down, the driver will put his foot an the pedal 29 and rotate the same counter-clockwise; this will cause the pivot 32 to move upwardly, thus forcing the rod 22 to move upwardly against the tension of spring 26 until the shield has been lowered to the desired extent. A plate 36 is loosely connected to cap 37 by means of a screw 38, and has a hole 39, through which the rod 27 moves. Hole 39 is slightly larger in diameter than the rod 27, with the result that the latter will move freely in an upward direction, but will be locked against downward movement; therefore, when the rod 27 has been moved upwardly through the action of the pedal 29, it will remain in any position in which it is placed until the locking plate 36 is released by an upward pressure with the foot.

Figure 3:
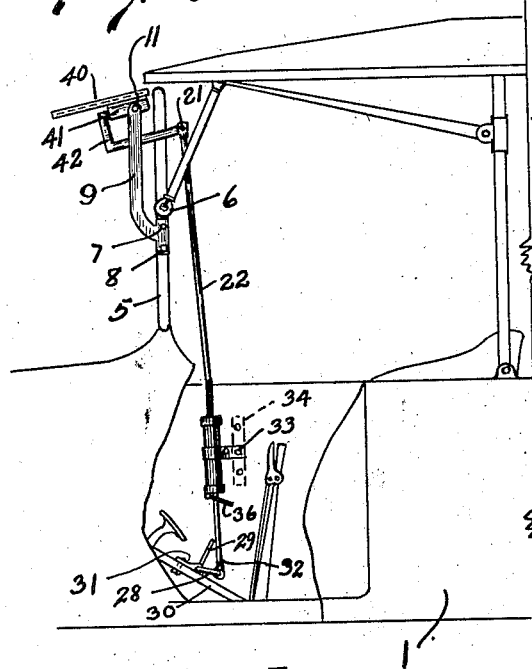
Fig. 3 is a view similar to that shown in Fig. 1 and shows a modified form of operating mechanism.
Figures 4, 5, 6:
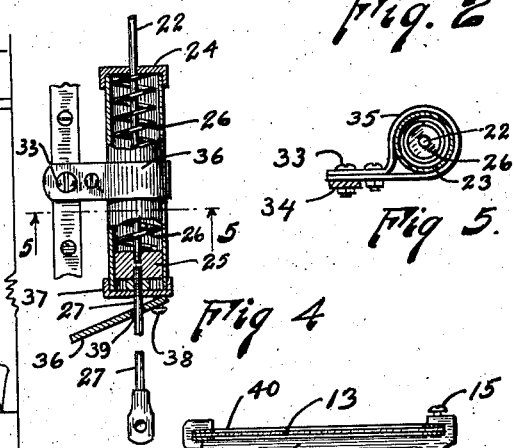
Fig. 4 is a side view of the spring enclosing casing with parts thereof broken away to better show the construction.
Fig. 5 is a section taken on line 5—5 Fig. 4.
Fig. 6 is an end view of a shield bracket showing the shield in place therein.

In Fig. 3 I have shown a modified form of my invention, in which the lever 19 and rod 17, as well as the bracket 10, are dispensed with. The shield 13 is surrounded by a metal frame formed by U-shaped metal strips 14 in the manner above described. To each tranverse end 40 of the shield frame I secure a short angular member 41, which is provided with a hole for the reception of a pivot pin 11. To the angle 41 on the right side of the car I secure a lever 42, which is formed in a substantial U-shape with one side longer than the other, the shorter side being secured to the bracket 41, and the longer side extending backwardly to the rear of the windshield, where it is pivotally attached to the upper end of rod 22, in the manner shown in Fig. 3.

It is evident that when my device is applied to different makes of cars than that shown, various minor changes must be made in the means by which it is secured in place. The principle, however, remains the same, regardless of what specific means are employed to hold the shield and the operating means in place.

My device operates as follows: The shield is hinged to the top of the windshield frame by any suitable means, which may be varied to suit different makes of cars, and the parts are adjusted to normally occupy positions substantially as shown in Figs. 1 and 3. If for any reason the angle of inclination is to be increased, the operator merely rotates pedal 29 the required distance and thereby moves the shield in a manner apparent from the drawings. The plate 36 serves as a lock to hold rods 22 and 27 in adjusted position. A slight upward movement, in an upward direction, of plate 36 releases the rod 27 and spring 26 functions to return all parts to normal position.

Having now described my invention, what I claim as new is—

In combination, a body member; a windshield frame attached thereto; a pair of supporting brackets attached to the frame; a bracket pivotally attached to the upper end of each supporting bracket; a translucent shield member carried by said last named bracket; an arm secured to one of said brackets and having its outer end projecting to the other side of said windshield; a casing pivotally secured to the body member; a spring in said casing; a rod passing through said spring and said casing and connected to the end of said arm; an abutment member secured to the rod and engaging the lower end of said spring; means for moving the rod upwardly whereby the spring is compressed and the shield tilted downwardly, said means comprising a pivotally mounted pedal; and locking means for holding the rod in its upward position.

In testimony whereof I affix my signature.

JOHN C. BARTLEY.